United States Patent [19]

Sands

[11] 4,030,520
[45] June 21, 1977

[54] BALL-TYPE SAFETY VALVE

[76] Inventor: Asa D. Sands, 3606 Federal St., Camden, N.J. 08105

[22] Filed: Aug. 5, 1976

[21] Appl. No.: 711,977

[52] U.S. Cl. .................... 137/513.5; 137/513.7; 137/514; 137/515.5; 137/517; 137/519.5

[51] Int. Cl.$^2$ ........................ F16K 15/00

[58] Field of Search .......... 137/498, 513.3, 513.5, 137/513.7, 514, 515.5, 517, 519.5, 516.25, 516.27

[56] References Cited

UNITED STATES PATENTS

| 398,111 | 2/1899 | Abbot | 137/516.25 X |
| 701,754 | 6/1902 | Moran | 137/517 X |
| 1,015,142 | 1/1912 | Criswell | 137/513.5 |
| 1,788,358 | 1/1931 | Goerg | 137/513.7 |
| 2,323,352 | 7/1943 | Pitts | 137/516.25 X |
| 2,469,505 | 5/1949 | Keefer | 137/517 |
| 2,929,399 | 3/1960 | Magowan | 137/517 X |
| 3,437,065 | 4/1969 | Robbins | 137/517 U X |
| 3,561,471 | 2/1971 | Sands | 137/498 |

Primary Examiner—Robert G. Nilson

[57] ABSTRACT

A safety valve has a valve body defining a valve chamber having a longitudinal axis with flow passages at opposite ends of the axis, transverse walls at opposite ends of the valve chamber separating the valve chamber from the flow passages, valve ports through the transverse walls coaxial with the valve chamber, at least one of the valve ports being defined by a frusto-conical valve seat facing the valve chamber and by a cylindrical inner surface between the valve seat and the side of the one valve port opposite the valve chamber, an annular groove formed in the cylindrical surface of the one valve port, a convolute coil spring having a large end coil seated in the annular groove and a small end axially removed from the large end in the direction of the valve chamber and located within the confines of the valve seat, a ball valve of small diameter than the valve chamber disposed in the chamber and movable toward and away from the seat, and a leak passage for bypassing a restricted flow of fluid around the valve when the valve is closed. In one embodiment of the invention both valve ports are similarly defined and both include convolute coil springs so that the valve may operate bidirectionally. In another embodiment, the valve is designed for unidirectional use, however the valve body is generally the same as in the first embodiment except that the convolute spring and seat for same are omitted from the upstream valve port, and in lieu thereof an open ended frust-conical deflector is mounted coaxially within the port so that the deflector diverges toward the valve chamber forming an annular ring of fluid which tends to center the ball valve within the valve chamber.

7 Claims, 8 Drawing Figures

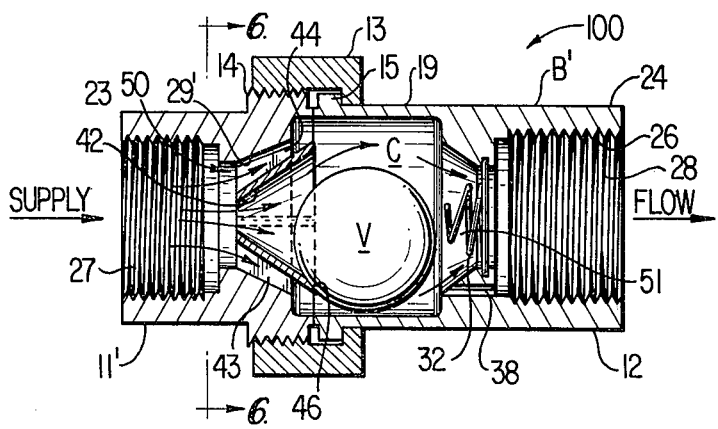
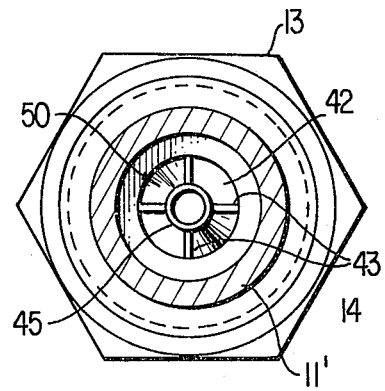
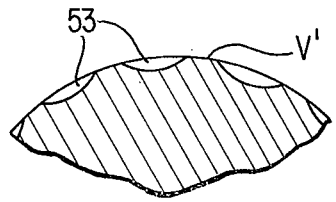
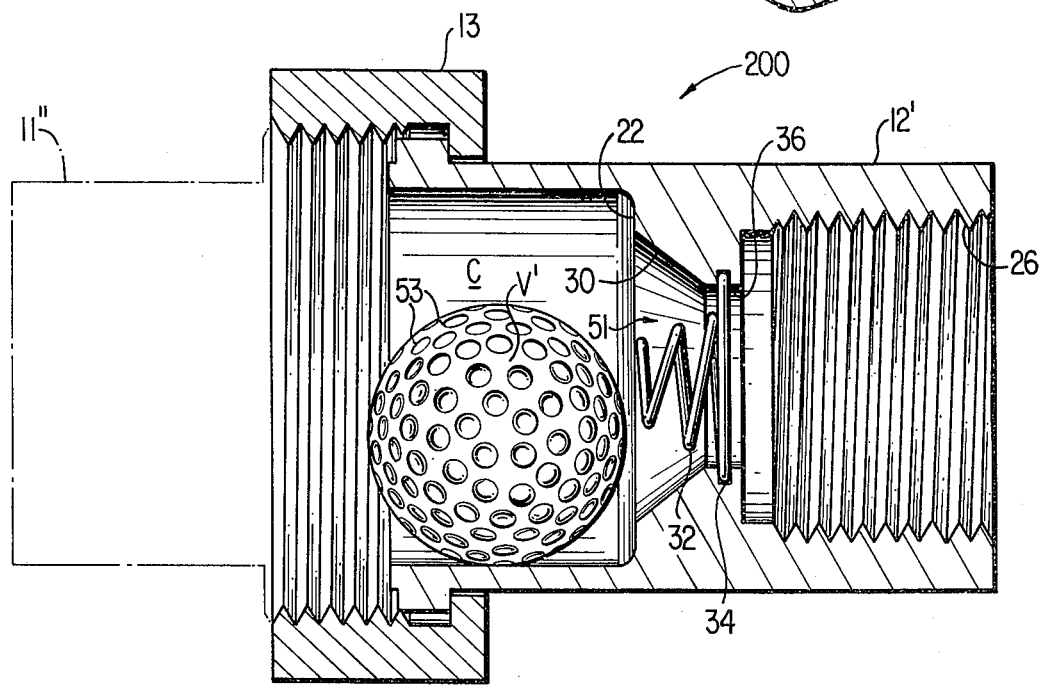

BALL-TYPE SAFETY VALVE

BACKGROUND OF INVENTION

1. Field of Invention

This invention relates to safety valves of the ball type for automatically closing a flow line upon excess fluid flow above a predetermined maximum flow rate resulting from a break in the line or other line disruption, and particularly to safety valves which are self opening upon restoration of the broken or disrupted flow line to normal condition.

2. Description of the Prior Art

Ball type safety valves are disclosed in the prior art for use in fluid flow lines to automatically close upon a rupture of the flow line downstream from the valve to prevent hazardous conditions from occuring and to prevent the waste of the fluid. Patents representative of the prior art include the following:

| | | |
|---|---|---|
| 701,754 | Moran | June 3, 1902 |
| 1,788,358 | Georg | Jan. 6, 1931 |
| 3,441,042 | Schilling | Apr. 29, 1969 |
| 3,561,471 | Sands | Feb. 9, 1971 |
| 3,861,415 | Larsen | Jan. 21, 1975 |
| Great Britain 233,675 Cole Oct. 8, 1925 | | |
| Germany 950,251 Dolling Sept. 13, 1956 | | |

Summary of the Invention

This invention relates to improvements in the structure of ball type safety valves which are automatically responsive to an excess flow of fluid above a predetermined flow rate to close the valve.

It is an object of this invention to provide a ball safety valve which comprises a housing defining a valve chamber having a longitudinal axis, first and second flow passages at opposite ends of the housing which are coaxial with the valve chamber, transverse walls at opposite ends of the valve chamber which separate the valve chamber from the first and second flow passages, valve ports through the transverse walls in which are provided frusto-conical valve seats, convolute coil springs within the valve ports tapering toward the valve chamber, and a ball valve in the valve chamber, the ball valve being of smaller diameter than the axial and transverse cross sectional dimensions of said valve chamber so as to provide a flow passage around the ball within the valve chamber.

It is a further object of this inventon to provide a ball safety valve as described above which is bidirectional in that it will operate satisfactorily without regard to which end of the valve is connected to the fluid source.

It is a further object of this invention to provide a modified hall-safety valve which is unidirectional and includes a frusto-conical flow diverter within the valve port on the upstream side of the valve chamber in lieu of a convolute coil spring.

It is a further object of this invention to provide ball-safety valves as described above which are provided with leak passage means to allow restricted flow of fluid past the ball in the closed position thereof so as to restore pressure on the downstream side of the valve once a ruptured line downstream of the valve has been repaired, and thus to automatically open the valve. The leak passage may be restricted bypass ports through the valve seat, or as in another embodiment may comprise a dimpled surface of the ball from sealing against the valve seat.

BRIEF DESCRIPTION OF THE DRAWINGS

With the foregoing more important objects and features in view and such other objects and features which may become apparent as this specification proceeds, the invention will be understood from the following descripton taken in conjunction with the accompanying drawings, in which like characters of reference are used to designate like parts, and in which:

FIG. 5 is a longitudinal vertical sectional view of another embodiment of the invention;

FIG. 6 is a transverse cross sectional view taken on line 6—6 of FIG. 5;

FIG. 7 is an enlarged fragmentary sectional view of a portion of a modified ball valve element.

FIG. 8 is an enlarged longitudinal vertical sectional view of a safety valve according to this invention including a ball valve element with a dimpled surface as shown in FIG. 7.

DETAILED DESCRIPTION OF THE PREFERRED EMBODIMENTS

Figure 1:
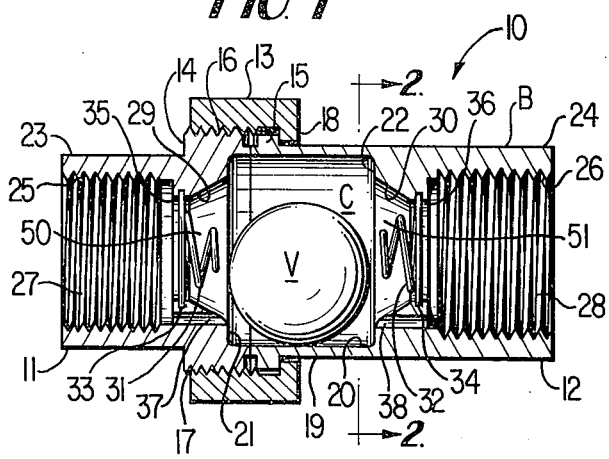
FIG. 1 is a longitudinal vertical sectional view of one embodiment of the invention.
Figure 2:
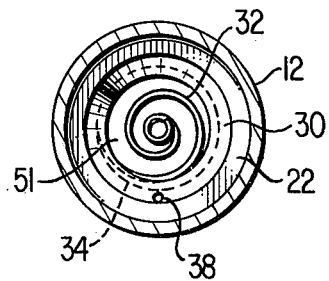
FIG. 2 is a transverse cross sectional view taken on line 2—2 of FIG. 1.

FIG. 1 illustrates one form of the safety valve assembly of this invention which is particularly useful in high pressure gas conduits. The safety valve assembly 10 includes a union valve body generally indicated by the letter B which body consists of a pair of externally flanged hollow body sections 11 and 12 and a coupling nut 13. The body section 11 has an externally threaded, laterally projecting flange 14 at its inner end, while the body portion 12 has a laterally projection unthreaded flange 15 at its inner end postioned adjacent the flange 14. The nut 13 has internal threads 16 which cooperate with external threads 17 on the valve body section 11, and an internal flange 18 which abuts against the flange 15 of body section 12. Tightening the nut 13 upon the threaded flange 14 draws the inner end of body section 12 tight against the inner end of body section 11 in a manner well known in the art to provide a fluid tight closure. The valve body B, when members 11 and 12 are joined, includes a hollow intermediate portion 19 having a cylindrical inner surface 20 and circular opposed transverse walls 21 and 22 encompassing a valve chamber C and hollow end portions 23 and 24 on opposite sides of the intermediate portion 19. The hollow end portions 23 and 24 have internally threaded cylindrical surfaces 25, 26 encompassing valve passages 27 and 28 respectively. The valve chamber C and the valve passages 27 and 28 have a common axis and the diameter of the valve chamber C is greater than the diameter of the valve passages 27 and 28. The transverse walls 21 and 22 separate the valve chamber C from the valve passages 27 and 28 respectively. Conical valve seats 29 and 30 are formed in the transverse walls 21 and 22 respectively to provide seats for a ball valve V within the valve chamber C. The ball valve V is of substantially smaller diameter than the internal diameter of the intermediate portion 19 and normally rests upon the bottom of the valve chamber C as shown in FIG. 1 Coiled convolute springs 31 and 32 are seated in annular grooves 33 and 34 respectively formed in the transverse walls 21 and 22. The annular grooves 33 and 34 are formed in cylindrical surfaces 35 and 36 respectively adjacent the small ends of the frusto-conical valve seats 29 and 30. Leak by pass passages 37 and 38 are provided through the transverse walls 21 and 22 respectively inorder to leak a restricted flow of fluid, as indicated by arrow 39 in FIG. 3, around the ball valve V when closed.

Figure 3:
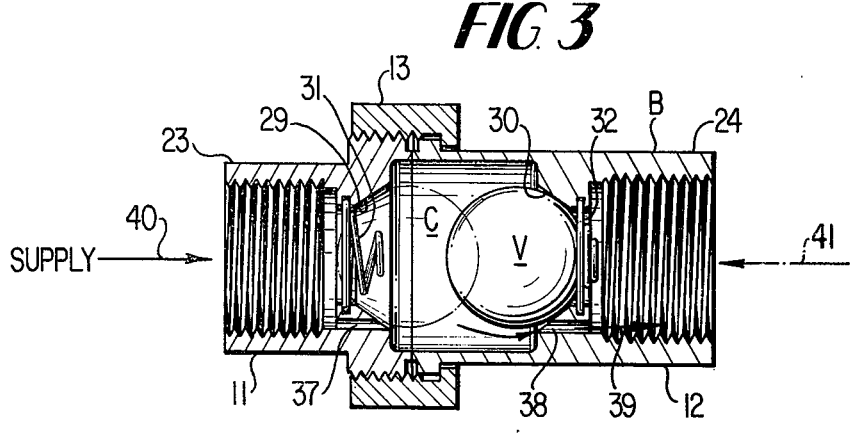
FIG. 3 is a view similar to FIG. 1 showing the valve in closed position.
Figure 4:
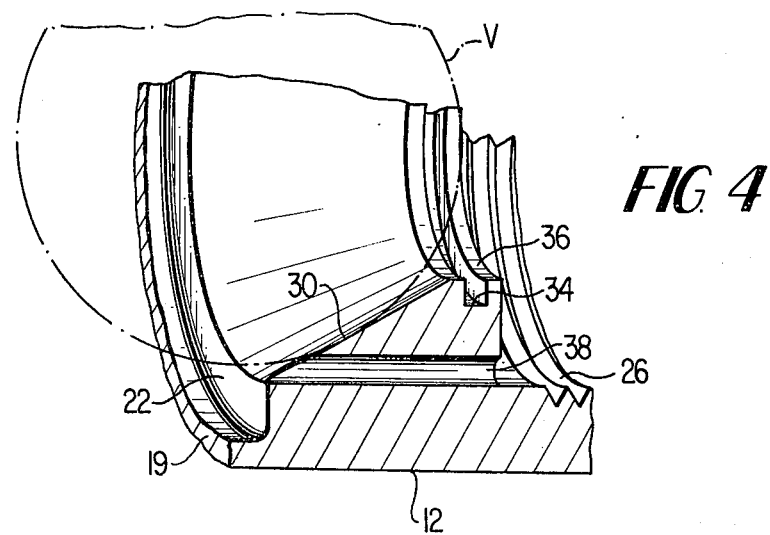
FIG. 4 is an enlarged fragmentary perspective view showing a portion of the invention including the valve seat.

The valve illustrated FIGS. 1–4 is bidirectional in that either end fitting 23 or 24 may be connected to the high pressure side of a flow line and the valve will operate satisfactorily. FIG. 3 shows the ball V in solid lines closed against the down stream valve seat 30 blocking the main volume of fluid flow from the high pressure side indicated by arrow 40. The ball valve V shown in dotted lines in FIG. 3 is closed against the valve seat 29 blocking fluid flow from the opposite side should the valve be connected with the source of high pressure fluid reversed as indicated by arrow 41.

With the valve 10 connected in a flow line, not shown, but understood to be connected by screw coupling threaded pipes into the fittings 23 and 24, the ball V will normally be located within the valve chamber C on the bottom thereof under the influence of its own weight. The distance between the small ends of the springs 31 and 32 is substantially greater than the diameter of the ball V so that the ball V is entirely free to move within the chamber C without interference from the springs. The normal flow of fluid when the valve is open as shown in FIG. 1, passes over and around the ball V from the high pressure side to the low pressure side. The ball will move against the spring in the valve port on the low pressure side, but it will not seat because of the resistance of the convolute coil spring. However, should the flow line rupture, an excess flow rate of fluid escaping through the rupture will force the ball against the valve seat on the side of the rupture overcoming the resistance of the convolute spring within the valve port and closing the valve. After the valve 10 is closed a small amount of fluid leaks pass the ball and its seat through the leak passage 37 or 38 depending upon which side of the valve body B the ball V is seated. The convolute springs 31 and 32 are selected to withstand a predetermind maximum flow rate without permitting the value V to close.

The frusto-conical valve seat 29 facing valve chamber C and the cylindrical surface 35 at the small end of the valve seat 29 remote from the chamber C, defines a valve port 50 through the transverse wall 21. Likewise the frusto-conical valve seat 30 facing valve chamber C and the cylindrical surface 36 at the small end of the valve seat 30 remote from the chamber C defines a valve port 15 through the transverse wall 22.

FIG. 5 shows a second valve embodiment 100 which is a unidirectional valve. The valve body B' is similar in most respects to the valve body B of FIGS. 1–4 except that a frusto-conical deflector 42 has been substituted for the convolute spring in the upstream valve port 50. The valve section 12 and coupling nut 13 are identical to like parts in the valve 10. The valve section 11' is like valve section 11 of the valve 10 except that the section 11' does not have an annular groove 33 for reception of a convolute spring, but instead, has the deflector 42 supported coaxially within the valve port 50 by angularly spaced radial spiders 43, of which there are four spaced 90 degrees apart. The spiders 43 are welded or otherwise secured to the outer surface of the deflector 42 and to the inner frusto-conical surface 29' corresponding to the frusto-conical valve seat 29 of valve 10. The spiders 43 space the deflector 42 from the frusto-conical surface 29' in order to provide a radially outwardly diverging annular flow passage 44 through the valve port. The small end 45 of the deflector 42 is open and located within the valve port 50 remote from the valve chamber C. The deflector diverges radially outwardly to a large open end 46 which terminates just inside the valve chamber C. The deflector thus divides the fluid flow from the passage 27 into an outer annular stream flowing outside of the deflector 42 and a central stream flowing through the deflector. The annular stream flowing through the annular flow passage 44 tends to lift the ball valve V off the bottom of the valve chamber C and center the ball relative to the axis of the valve 100. The flow of fluid through the center of the deflector 42 forces the ball V against the convolute spring 32. The spring 32 will keep the ball valve V from sealing against the conical valve seat 30 unless the flow of fluid through the valve 100 exceeds a predetermined maximum rate whereup on the spring 32 will yield and permit the ball to seat.

The valves 10 and 100 will open automatically upon repair of a rupture in the flow line downstream of the valves as a result of fluid leaking past the ball valve element V through the bypass port 37 in valve 10 depending upon how the valve 10 is connected. The fluid leaking past the seated ball valve element V builds up pressure in the restored downstream flow line until the downstream fluid pressure acting on the ball V plus the bias of the spring 32 overcomes the pressure acting on the upstream side of the ball V. The ball will then move off the valve seat into the valve chamber C.

FIGS. 7 and 8 illustrate a further modified ball safety valve 200 in which a ball valve element V' having dimples 53 provided in the surface of the ball is substituted for the smooth ball element V of valves 10 and 100. If the dimpled ball valve element V' is used, bypass ports through the transverse walls 21 and 22 are not required because the dimpled ball V' when seated against the frusto-conical valve seat 30 does not provide a fluid seal. Enough fluid will flow between the dimpled ball V' and the seat 30 to permit fluid pressure to build up on the downstream side of the valve element V' upon repair of a rupture in the downstream flow line to permit valve 200 to open. The housing B'' of valve 200 includes a valve section 11'' (shown in outline only), a valve section 12' and a coupling nut 13. The valve sections 11'' and 12' are similar to the valve sections 11 and 12 of valve 10 except that sections 11'' and 12' do not include bypass ports 37 and 38. Instead of combining valve sections 11'' and 12'', the valve section 11' of valve 100 may be combined with the valve section 12' and a dimpled ball valve V' to form a unidirectional valve.

While in the foregoing there has been described and shown a preferred embodiment of the invention, various modifications and equivalents may be resorted to within the spirit and scope of the invention as claimed.

What is claimed is:

1. In a flow operated safety valve, the combination of a valve body defining a valve chamber having a longitudinal axis with flow passages at opposite ends of said axis, a cylindrical inner surface about said valve chamber, transverse walls at opposite ends of said valve chamber separating said valve chamber from said flow passages and defining annular shoulders at opposite ends of said chamber, a valve port through each of said transverse walls coaxial with said valve chamber, at least one of said valve ports being defined by a frusto-conical valve seat facing said chamber and by a cylindrical surface at the end of said valve seat remote from said chamber, an annular groove formed in said cylindrical surface of said one valve port, a convolute coil spring having a large end coil seated in said annular groove and tapering axially in the direction of said chamber to a small end located within the confines of said valve seat, a ball valve of smaller diameter than said chamber disposed in the chamber and movable toward and away from said valve seat, said safety valve body when in normal use being mounted in a flow line with its longitudinal axis horizontal so that said ball valve normally rests on the lowest portion of said cylindrical inner surface of said valve chamber out of contact with said valve seat and said spring, said ball valve being responsive to an excess rate of fluid flow above a predetermined maximum flow rate in the direction of said seat to move against said spring compressing same and seating upon said conical valve seat, thus substantially reducing the flow of fluid through said valve, and restricted leak passage means for by-passing fluid around said ball valve and said valve seat.

2. The safety valve according to claim 1 wherein said leak passage means is a dimpled surface on said ball valve.

3. The safety valve according to claim 1 wherein said leak passages means comprises at least one restricted flow by-pass port through the transverse wall in which said at least one of said valve ports is located.

4. The safety valve according to claim 1 wherein the other valve port has a frusto-conical flow deflector mounted coaxially therein, spider support means within said other port spacing said deflector from the transverse wall through which said other port passes, said deflector having an open small end within said other valve port remote from said chamber, and an open large end within said chamber, said large end being of a diameter approximately equal to the diameter of said ball valve, said deflector causing fluid flowing through said other port in the direction of said chamber to divide and form an annular fluid ring which flows around said ball and a smaller stream which flows axially against said ball, said annular fluid ring tending to lift said ball from the bottom of said chamber and said smaller stream tending to press said valve against said spring.

5. The safety valve of claim 1 wherein said valve body includes a pair of laterally flanged coaxial valve sections, and coupling means joining said laterally flanged valve sections, each of said pair of valve sections including one of said opposite flow passages, one of said transverse walls and at least a portion of the cylindrical surface defining said valve chamber.

6. The safety valve according to claim 1 wherein each said valve ports is defined by frusto-conical valve seat facing said valve chamber and by a cylindrical surface at the end of said valve seat remote from said chamber, an annular groove formed in the cylindrical surface of each of said valve ports, and one of said convolute springs seated in each of said annular grooves.

7. The safety valve according to claim 6 wherein said ball valve has a dimpled surface, said dimpled surface when seated against one of said valve seats forming said restricted leak passage means for bypassing fluid around said ball valve when seated.

* * * * *